(12) United States Patent
Chambers et al.

(10) Patent No.: US 10,466,403 B2
(45) Date of Patent: Nov. 5, 2019

(54) LIGHT GUIDE ASSEMBLY FOR AN LCD OR THE LIKE

(71) Applicant: Polaris Industries Inc., Medina, MN (US)

(72) Inventors: Travis Chambers, Medina, MN (US); Justin Larson, Medina, MN (US)

(73) Assignee: Polaris Industries Inc., Medina, MN (US)

( * ) Notice: Subject to any disclaimer, the term of this patent is extended or adjusted under 35 U.S.C. 154(b) by 384 days.

(21) Appl. No.: 14/470,770

(22) Filed: Aug. 27, 2014

(65) Prior Publication Data

US 2016/0062025 A1   Mar. 3, 2016
US 2017/0184774 A9   Jun. 29, 2017

Related U.S. Application Data

(60) Provisional application No. 62/031,100, filed on Jul. 30, 2014.

(51) Int. Cl.
| | |
|---|---|
| *G02B 6/26* | (2006.01) |
| *F21V 8/00* | (2006.01) |
| *B62J 6/00* | (2006.01) |
| *B62J 99/00* | (2009.01) |

(52) U.S. Cl.
CPC .............. *G02B 6/0036* (2013.01); *B62J 6/00* (2013.01); *G02B 6/0065* (2013.01); *G02B 6/0093* (2013.01); *B62J 2099/0026* (2013.01); *G02B 6/0088* (2013.01)

(58) Field of Classification Search
CPC .... G02B 6/0016; G02B 6/004; G02B 6/0093; G02B 6/0065; G02B 6/0036; G02F 2001/133311; G02F 1/133602; G02F 1/133524

USPC ........................................................ 349/62, 65
See application file for complete search history.

(56) References Cited

U.S. PATENT DOCUMENTS

| | | | | |
|---|---|---|---|---|
| 5,134,549 A * | 7/1992 | Yokoyama | ........... | G02B 6/0043 362/223 |
| 6,172,356 B1 * | 1/2001 | Ogura | ................ | H04N 1/02835 250/227.11 |
| 6,612,722 B2 * | 9/2003 | Ryu | ..................... | G02B 6/0036 349/65 |

(Continued)

OTHER PUBLICATIONS

Illustration of prior art, circa Jan. 1, 2014, as described in U.S. Appl. No. 14/470,770, paragraphs 0004-0006, 2 pages.

*Primary Examiner* — Karabi Guharay
(74) *Attorney, Agent, or Firm* — Faegre Baker Daniels LLP (57) ABSTRACT

An apparatus and method for assembling a display device to which is coupled a light guide that has smooth surfaces for light-transmission and at least one surface that is for light scattering and internal reflection. The method includes depositing a reflective coating on that surface, and installing the display device with coupled light guide in an interior of a meter housing or casing. A portion of the casing interior is filled with a component, such as epoxy, for sealing the case interior to protect the display device and light guide against water and dust penetration. All surfaces of the light guide are protected from direct contact with the epoxy. This approach greatly simplifies the assembly process and yields a robust display that also prevents light leakage from the light guide.

10 Claims, 7 Drawing Sheets

(56) References Cited

U.S. PATENT DOCUMENTS

| | | | | |
|---|---|---|---|---|
| 7,478,642 | B2 * | 1/2009 | Koch | A47L 15/505 |
| | | | | 134/135 |
| 7,588,365 | B2 * | 9/2009 | Katsumata | G02B 6/0043 |
| | | | | 362/623 |
| 8,434,923 | B2 * | 5/2013 | Huang | G02B 6/0043 |
| | | | | 362/606 |
| 2011/0170036 | A1 * | 7/2011 | Ishikawa | G02B 6/0016 |
| | | | | 349/65 |
| 2012/0026429 | A1 * | 2/2012 | Chen | G02B 6/004 |
| | | | | 349/65 |
| 2012/0249921 | A1 * | 10/2012 | Yu | G02B 6/0031 |
| | | | | 349/62 |
| 2012/0287665 | A1 * | 11/2012 | Hyakuta | G02B 6/0043 |
| | | | | 362/602 |
| 2014/0204310 | A1 * | 7/2014 | Lee | G02F 1/133308 |
| | | | | 349/62 |

\* cited by examiner

LIGHT GUIDE ASSEMBLY FOR AN LCD OR THE LIKE

CROSS-REFERENCE TO RELATED APPLICATION

This application claims priority to U.S. Provisional Patent Application No. 62/031,100, filed on Jul. 30, 2014, the disclosure of which is expressly incorporated herein by reference.

FIELD OF THE INVENTION

This invention relates to a backlit display device such as a liquid crystal display (LCD), and in particular to a light guide assembly that provides the back light for the display.

BACKGROUND AND SUMMARY OF THE INVENTION

Meters used on motorcycles include digital displays of running time (hours), engine temperature and other information. Since the motorcycles may be of the trail-type for traversing rough terrain, the meters must be robust to withstand vibration and shock. The meters must also be well sealed to prevent penetration of fine dust and liquid into the meter.

The meters of interest here include, among other components, a digital LCD that is backlit by light that is provided by a light guide. In this case, the light guide is a transparent glass-like solid through which light propagates from one end of the guide to another. The light guide is coupled to the display and transmits light from a source, such as one or more light emitting diodes (LEDs) carried on a nearby printed circuit board, to the back side of the display for illuminating or "back lighting" the display for viewing through its transparent front or display side. The back lighting is especially helpful for viewing under low ambient light conditions.

The meter components are housed in a casing that is mounted to the motorcycle. A cable is often included to deliver information from a remote sensor to the meter. An opening in the casing permits viewing of the front of the display. To enhance the robustness of the meter, the assembly process may include a liquid epoxy resin that is injected into the casing interior after the display, light guide, and associated circuit board are in place. The epoxy cures to encapsulate the components against penetration by damaging liquid or dust. The epoxy also serves a dual purpose of anchoring the components in the casing interior for securing the components in place, and for damping vibrations that are received by the meter casing to thus protect the interior components.

One problem with the epoxy encapsulation technique just mentioned is ensuring that the epoxy does not come into direct contact with the light guide, which may be, for example, formed of optically-clear acrylic. Such contact with the exterior of the light guide will change the refraction characteristics of the outer surface of the guide so that light inside the guide (and propagating from the source to back light the display) will be absorbed by the epoxy. This absorption reduces the illumination of the display to unacceptably low levels. The absorbed, lost light is sometimes referred to as light that has "leaked" from the light guide.

One prior solution to the foregoing problem is to place a reflective tape around the exterior of the surfaces that are intended to reflect light along the light guide. This approach, however, is time consuming and requires a labor-intensive assembly process. Moreover, given the complex shape of some light guides it is difficult to effectively apply the tape to all of the surface portions that may be exposed to contact with the later applied epoxy.

The present invention is directed to a solution to the foregoing problems and provides, among other things, an innovative way of assembling a display device to which is coupled a light guide that has smooth surfaces for light-transmission and at least one surface that is configured for light scattering and internal reflection. The method includes depositing on that surface a reflective coating, and installing the display device with coupled light guide in an interior of a meter housing or casing. At least a portion of the casing interior is filled with an epoxy for sealing the display device with coupled light guide against water and dust penetration. All surfaces of the light guide are protected against direct contact with the epoxy or with any contaminant. This approach greatly simplifies the assembly process and yields a robust display without light leaking from the light guide.

Other advantages and features of the present invention will become clear upon study of the following portion of this specification and drawings.

DETAILED DESCRIPTION

Figure 1:
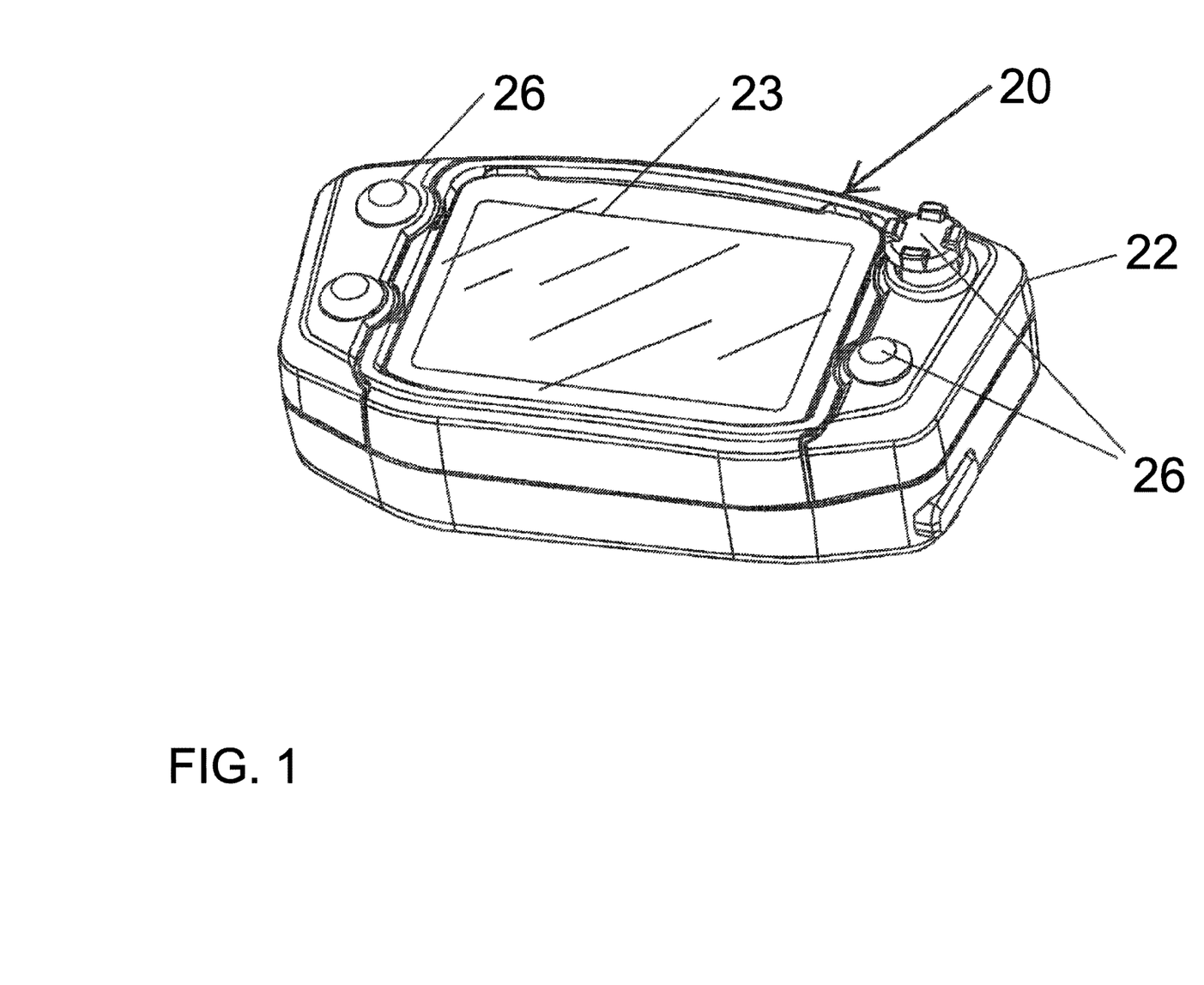
FIG. 1 is a perspective view of an exemplary motorcycle meter that includes a display with which the light guide assembly of the present invention may be employed.

Shown in FIG. 1 is an exemplary motorcycle meter 20 that includes a display with which the light guide assembly of the present invention may be employed. The meter 20 houses internal components inside of a casing 22, which can be two casing parts attached together. The casing 22 includes an opening 23 on the side of the meter facing the viewer. The meter can include any of a variety of manual control buttons and knobs 26.

Figure 2:
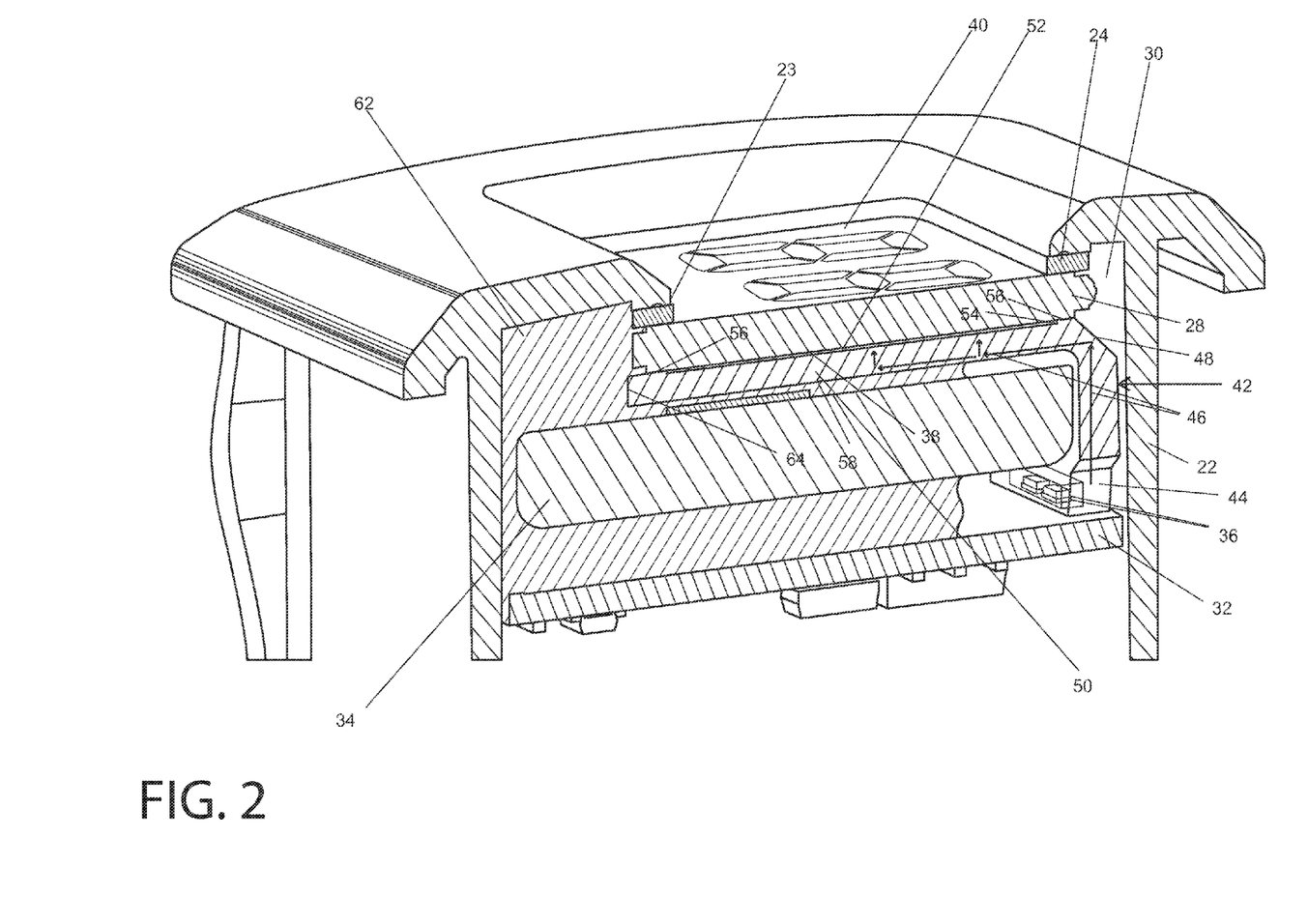
FIG. 2 is an enlarged cross section of a meter that includes a display with coupled light guide assembly of the present invention.

With reference to FIG. 2, a display device such as a liquid crystal display (LCD) 28 is mounted in the interior space 30 of the casing 22 with the edges of the LCD 28 abutting the opening 23 in the casing 22. A rectangular gasket 24 is present between the edges of the LCD 28 and the opening 23. Other components of the meter 20 are also carried in this space 30, including the meter's printed circuit board (PCB) 32 with circuit components mounted thereto, as well as a power supply, which in this instance can be a coin cell 34.

One of the components mounted to the PCB 32 is an array of light emitting diodes (LEDs) 36, which may comprise three separate diodes, emitting blue-, red- and green-wavelength light. In this embodiment, there are two such LED arrays 36 (hereafter referred to as simply "LEDs") carried on the PCB 32.

The LCD 28 is backlit with light that is directed through a backlit face 38 on the inward-facing surface of the LCD, so that the display face 40 on the opposite surface of the LCD 28 is sufficiently illuminated for viewing through the opening 23.

With reference to FIGS. 2-7, a light guide 42 formed in accordance with the present invention is coupled to the LCD 28 and transmits light from the LEDs 36 on the PCB 32 to the backlit face 38 of the LCD 28. Preferably, the light guide 42 is a transparent thermoplastic formed of PMMA (Poly (methyl methacrylate), a material that is hereafter referred to as acrylic.

The light guide 42 includes a downwardly extending pair of inlets 44 that each include a recess 45 (FIG. 3) for receiving and enclosing therein an LED 36 that protrudes from the surface of the PCB 32. As a result, light from the LEDs 36 is directed into the core of the light guide 42 for propagating along its length.

Figure 4:
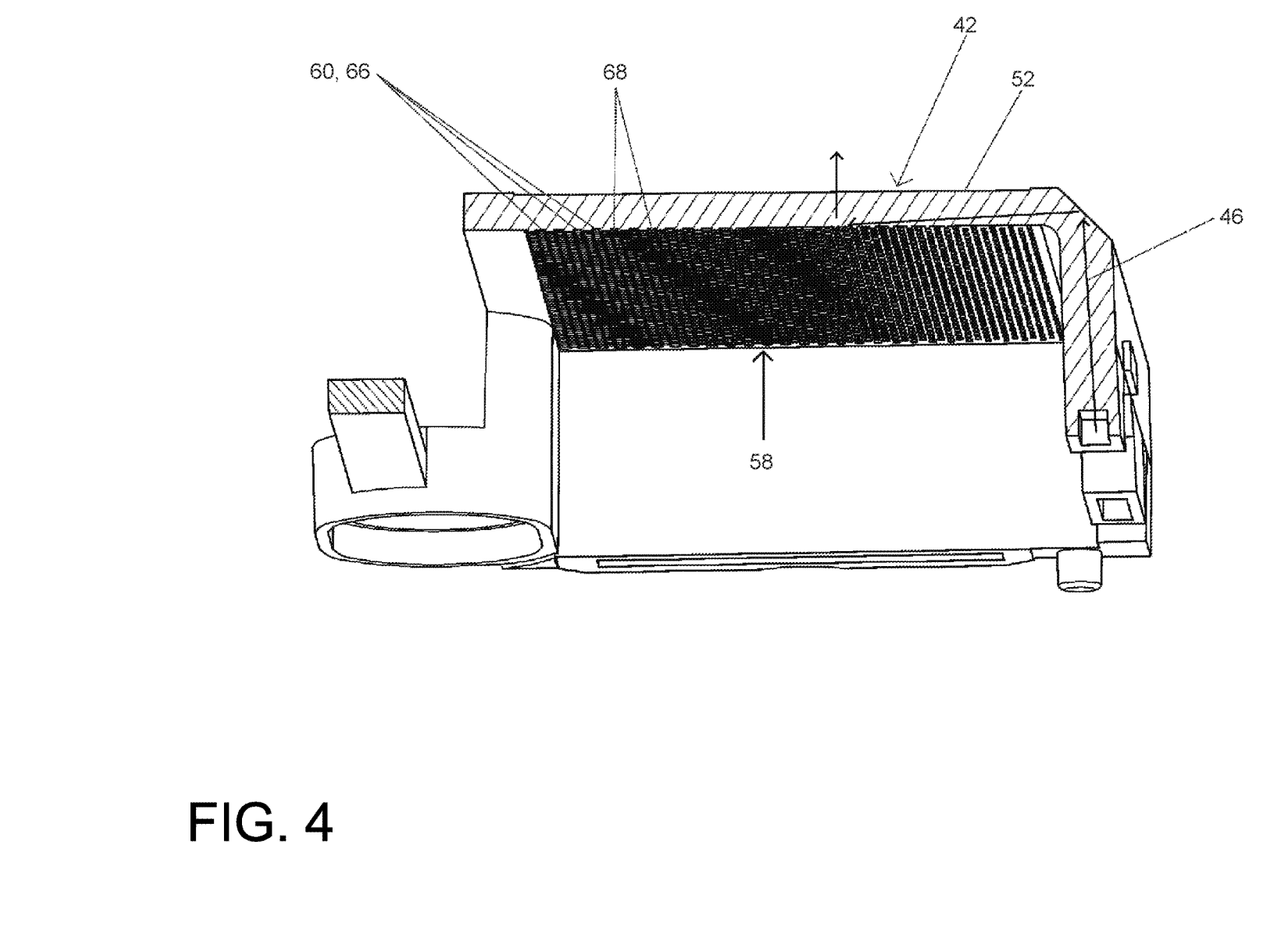
FIG. 4 is an enlarged detail view of the cross section of FIG. 2 showing protuberances in the light guide of the present invention for scattering and reflecting light toward an outlet surface of the light guide.

The general path of the light propagating through the light guide 42 is depicted by arrows 46 in FIGS. 2 and 4. Generally, the light moves from the inlets 44 until encountering an angled surface 48 (FIGS. 2 and 5) whence the light is reflected to travel through a generally plate-shaped part 50 of the light guide 42 that, when mounted to the casing 22 (FIG. 2) extends across the entire area of the backlit face 38 of the LCD 28.

As indicated by the path arrow 46 the light propagating through the light guide 42 emanates from an outlet surface 52 of the light guide 42. That surface 52 is adjacent to but slightly spaced from the backlit face 38 of the LCD 28 owing to a peripheral rim 54 integrally formed in the light guide 42 to extend upwardly (FIG. 2) and surround the outlet surface 52 like a four-sided frame.

An adhesive is applied to the flat, contact surface 56 of the rim 54 to bond that surface to the edges of the backlit face 38 of the LCD 28. This configuration provides a peripheral seal surrounding the spaced-apart junction of the light guide outlet surface 52 and the backlit face 38 of the LCD 28, thereby preventing fluid from moving between the backlit face and the outlet surface, which would degrade the quality of the display.

Figure 3:
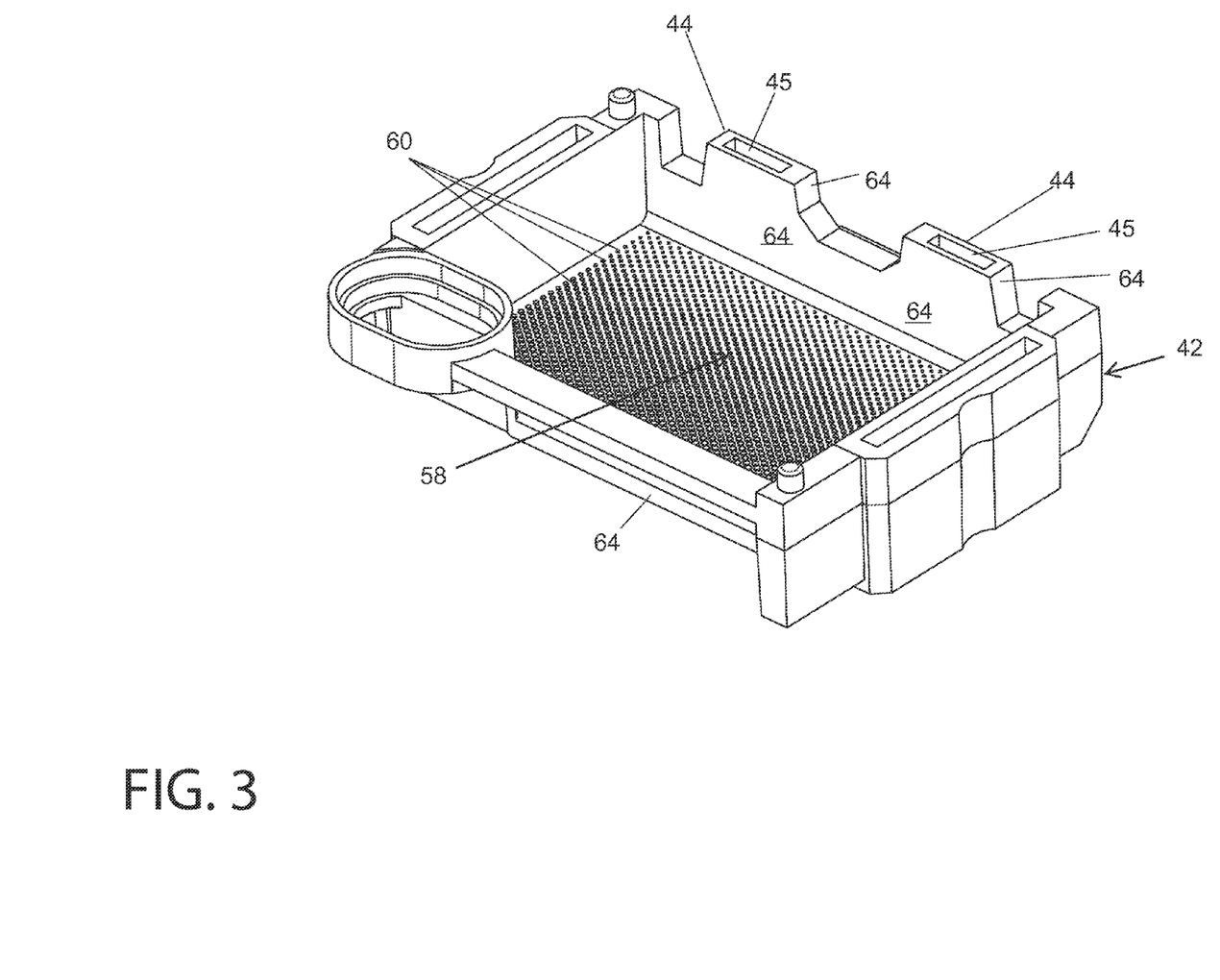
FIG. 3 is a perspective view of the back of a light guide component of the present invention.

With particular reference to FIGS. 3 and 4, the light guide 42 includes a rear surface 58 that is opposite and parallel to the light guide outlet surface 52. The rear surface 58 includes an array of integrally formed protuberances 60 dispersed across the rear surface to protrude outwardly therefrom. In the present embodiment, the protuberances 60 are cylindrically shaped and act as light traps to capture some of the light that traverses the area of the plate-shaped part 50 of the light guide. The light captured or impinging on the traps (protuberances 60) is scattered and reflected generally toward and through the outlet surface 52 of the light guide and into the backlit face 38 of the LCD 28 to thus serve as back light for the display as described above.

It is noteworthy here that as the distance from the source of light, LEDs 36, increases, (that is, right to left in FIGS. 2 and 4) the diameters of the cylindrical protuberances 60 increase to form a progressively larger set of light traps to reflect correspondingly increasing amounts of the light toward the LCD 28. This has the effect of compensating for inevitable losses of light intensity as the light propagates through the guide, and the result is a more uniformly illuminated display than would be the case if the protuberances were all same diameter.

While the cylindrical-shaped, outwardly protruding protuberances 60 are described as preferred as light traps mentioned above, it is contemplated that other configurations of the light guide rear surface 58 may be employed for accomplishing the light scattering as discussed above. For instance, the rear surface need not be planar, and may be configured with inwardly protruding recesses or pockets of various regular and irregular shapes. Thus, as used here, the term protuberances can be considered as extending inwardly or outwardly, and have various shapes.

As noted earlier, with all of the meter components assembled, including the light guide assembly and coupled display as just described, the remaining interior space 30 of the casing 22 (FIG. 2) is filled, as by injection, with a seal component 62, which in this embodiment comprises a liquid, curable epoxy. A portion of the seal component 62 is depicted in FIG. 2 as cross hatching, with the understanding that the seal component 62 flows into and fills all of the voids in the interior space 30 around the meter components inside the casing 22. The epoxy cures to encapsulate the components against penetration by potentially damaging liquid or dust. The epoxy also serves a dual purpose of anchoring the components in the casing interior for securing the components in place, and damping vibrations that are received by the meter casing 22 to thus protect the interior components from excessive vibration.

As noted earlier, any light propagating through the acrylic light guide 42 can be lost (leaked) from the guide before reaching the guide's outlet surface 52 if the seal component 62 described above comes in direct contact with any surface of the guide. Accordingly, prior to applying the seal component 62, and for that matter prior to assembling the light guide and related components, many of the exterior surfaces of the light guide 42 are coated with reflective material so that the reflective material is applied directly to the light guide, between the guide and the later-applied seal component 62.

Figure 5:
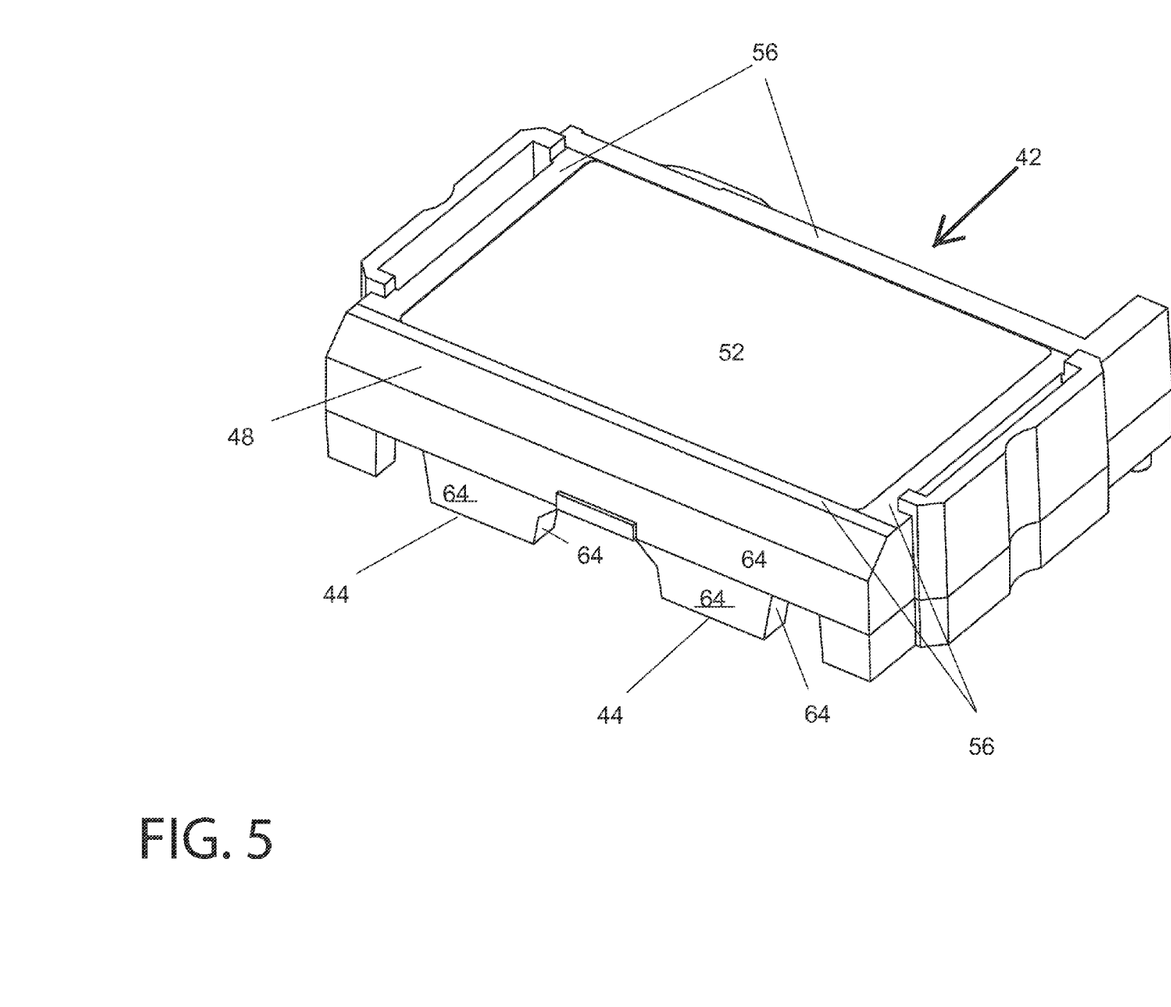
FIG. 5 is a perspective view of the front of the light guide component of the present invention.

In a preferred embodiment the reflective material is a thin film of aluminum applied, for example, by vacuum deposition. FIG. 5 depicts the light guide 42 with the outlet surface 52 facing upwardly. It is contemplated that this surface is protectively masked during the application of the reflective coating since that surface is to remain transmissive to light. With reference to FIGS. 3 and 5, the exterior surfaces 64 of the part of the light guide 42 that defines the inlets 44 receive the reflective coating, although the recesses 45 are masked to prevent coating the region where the light enters the guide from the source LEDs as discussed above.

The contact surfaces 56 (FIGS. 2 and 5) of the rim 54 of the light guide 42 are also coated with the reflective material before being bonded to the display as described above. It is noteworthy here that of the four sides of the rim 48, the reflective coating need not be applied to the contact surfaces 56 corresponding to the sides that are generally parallel to the path of the light across the guide (that is, the short sides in FIG. 5) since loss of light at those edges would not noticeably degrade the level of illumination of the display. Nonetheless, these sides need not be masked and can in fact be coated with reflective material without deleterious effect on the display.

The reflective coating is also applied to the angled surface 48 (FIG. 5), so that the reflective aspect of that surface, as discussed above, is maintained after the seal component 62 is added. Moreover, the exterior of the end surface 64 (FIGS. 2 and 3) opposite the angled surface 48 has applied to it the reflective coating.

Figure 6:
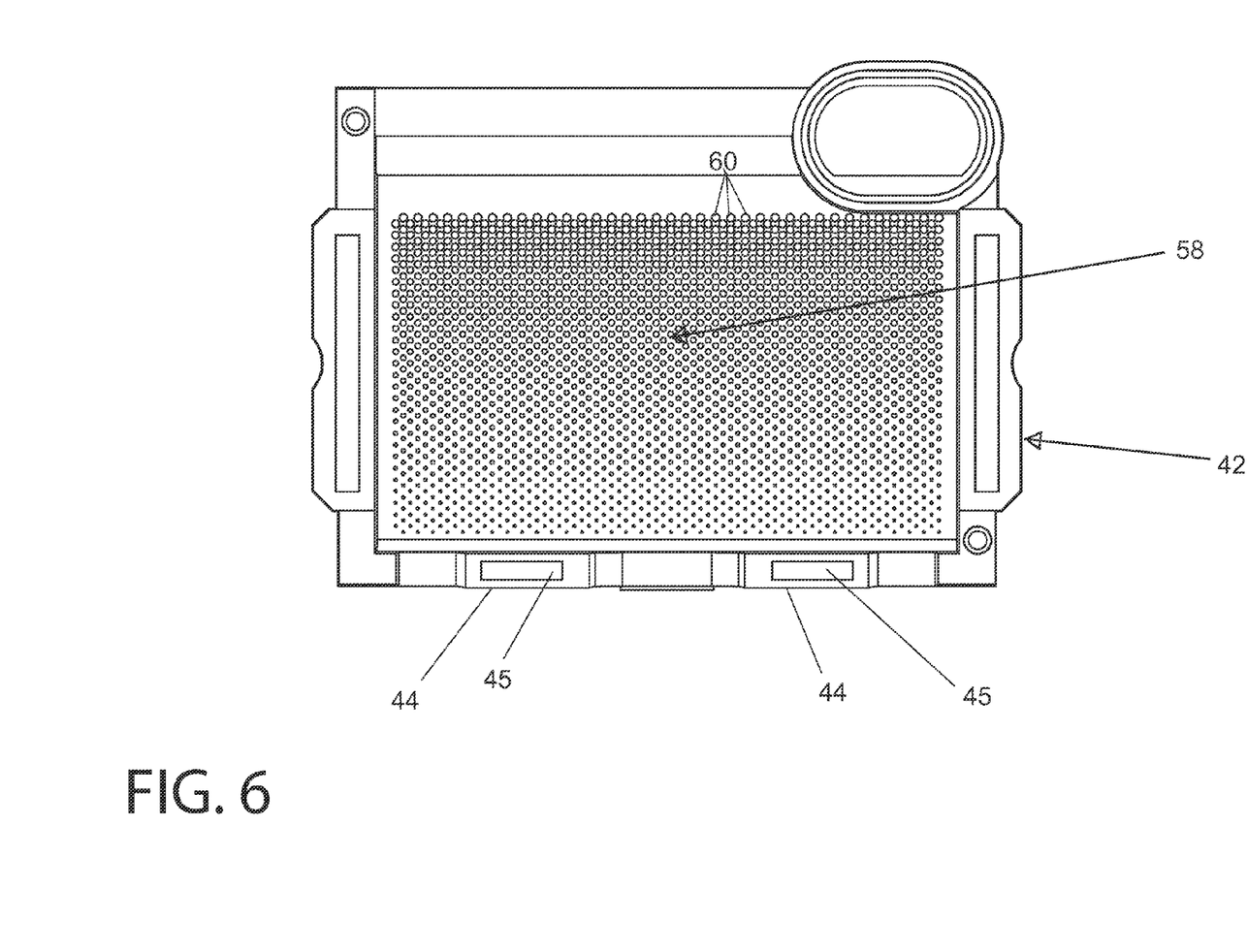
FIG. 6 is a bottom plan view of the light guide component of the present invention.
Figure 7:
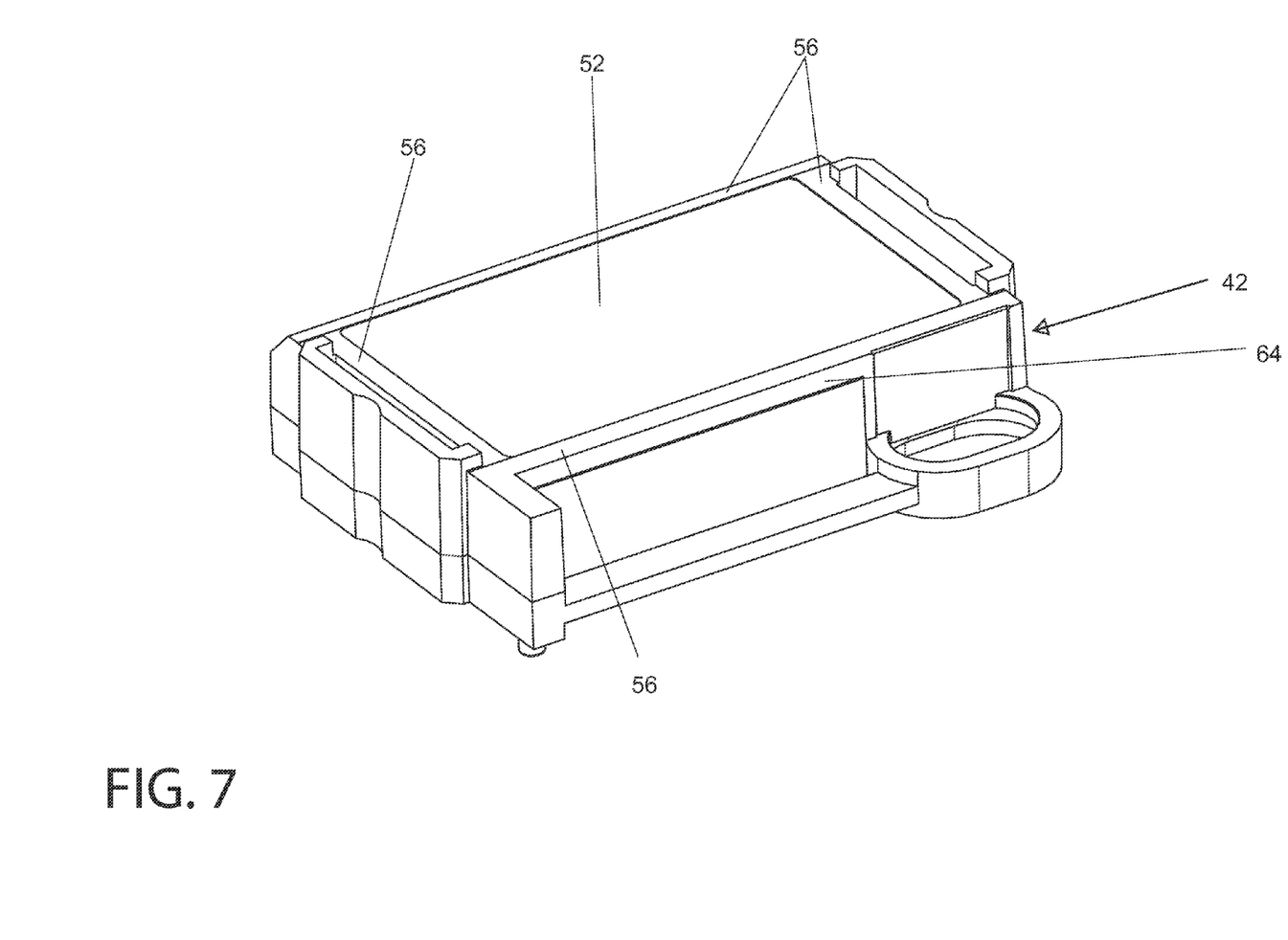
FIG. 7 is a perspective view like FIG. 5 of the light guide component of the present invention, but rotated 180 degrees about a vertical axis.

With particular reference to FIGS. 3, 4 and 6, the entire rear surface 58 of the light guide has applied to it the reflective coating noted above. FIG. 4 shows in cross section some of these protuberances 60 that that make up the array of integrally formed protuberances 60 dispersed across the rear surface 58 to extend therefrom. As noted earlier, the preferred protuberances 60 are cylindrically shaped and thus define associated outer surfaces 66 (FIG. 4) that protrude from the otherwise planar portions 68 of rear surface 58. These surfaces 66, 68 provide the primary function of the light traps as discussed above. The application of the thin film of reflective material, as by deposition of aluminum, ensures that all of these surfaces are coated to thus protect against direct contact of the surfaces with the later-applied seal component 62 and attendant light leakage as discussed above.

By coating the entirety of the rear surface 58 (that is, all of surfaces 66, 68) that surface is completely protected against potentially light leaking contact with the seal component 62 as well as any other contaminants (fine dust, etc.) that may over time make its way into the interior of the meter casing 22.

Put another way, any surface of the light guide 42 that may be exposed to direct contact with the seal component 62 when mounted in the casing 22 may be covered with the reflective coating, but the surfaces specifically mentioned as coated above should be so coated for best results.

While the foregoing description was made in the context of preferred embodiments, it is contemplated that modifications to those embodiments may be made without departure from the invention as claimed. For instance, backlit displays other than LCD type may be employed, and seal components other than epoxy are contemplated.

The invention claimed is:

1. A light guide assembly for coupling with a display device and a light source, the light guide assembly comprising:
   a light-transmissive light guide having:
      an inlet for receiving light that enters the light guide to propagate along a path through the light guide;
      an outlet surface from which emanates the light that propagates through the guide, the emanating light providing light to a display device when the outlet surface is coupled to the display device;
      an angled surface disposed between the inlet and the outlet surface and having a reflective coating applied thereto, wherein the inlet, the angled surface, and the outlet are collectively configured such that light propagating through the guide from the inlet to the angled surface proceeds in a first direction that is substantially perpendicular to a plane of the outlet surface, is reflected by the angled surface, and thereafter proceeds from the angled surface towards the outlet surface in a second direction that is substantially parallel to the plane of the outlet surface; and
      a plurality of protuberances dispersed across a rear surface of the light guide that is opposite the outlet surface of the light guide, the protuberances having outer surfaces and being disposed in the path of the light that propagates within the guide so that the light that is propagating in the second direction from the angled surface towards the outlet surface impinges upon and is scattered by the protuberances, wherein the protuberances protrude from an otherwise planar portion of the rear surface,
   wherein the reflective coating is further applied to the outer surfaces of the protuberances and to the planar portion of the rear surface such that light impinging on the protuberances and on the planar portion of the rear surface is reflected therefrom through the outlet surface of the light guide in a third direction that is substantially perpendicular to the plane of the outlet surface.

2. The light guide assembly of claim 1, wherein the reflective coating is applied by vacuum deposition.

3. The light guide assembly of claim 1, further comprising:
   a seal component adhered to the reflective coating such that the coating is between the light guide and the seal component, the seal component surrounding and encapsulating the light guide, but not contacting the outlet surface of the light guide, wherein at least a portion of the display device is coupled to the light guide adjacent to the outlet surface.

4. The light guide assembly of claim 3, wherein the display device has a display face and an opposing backlit face and is coupled to the light guide with the backlit face adjacent to the outlet surface of the light guide, the assembly further comprising a peripheral seal disposed around the outlet surface between the light guide and display device for preventing fluid from moving between the backlit face and the outlet surface.

5. The light guide assembly of claim 4, further comprising:
   a casing inside of which the coupled display device and light guide are mounted so that the display face is sealed against an opening in the casing, the casing having an interior space behind the display device within which resides the light guide,
   wherein the seal component is an epoxy that fills a part of the interior space to encapsulate the coupled display device and light guide therein.

6. The light guide assembly of claim 1, wherein each protuberance in the plurality of protuberances is cylindrically-shaped.

7. The light guide assembly of claim 6, wherein respective diameters of the respective protuberances increase with distance from the angled surface.

8. The light guide assembly of claim 1, wherein the light guide comprises a rim integrally formed with and generally surrounding the outlet surface, and the reflective coating is applied to at least a portion of the rim.

9. The light guide assembly of claim 8, wherein the rim projects forwardly relative to the outlet surface.

10. The light guide assembly of claim 1, wherein respective sizes of the respective protuberances increase with distance from the angled surface.

* * * * *